Nov. 13, 1923.  
G. E. GRIMM  
1,474,076  
WINDSHIELD LATCH  
Filed Sept. 14, 1920
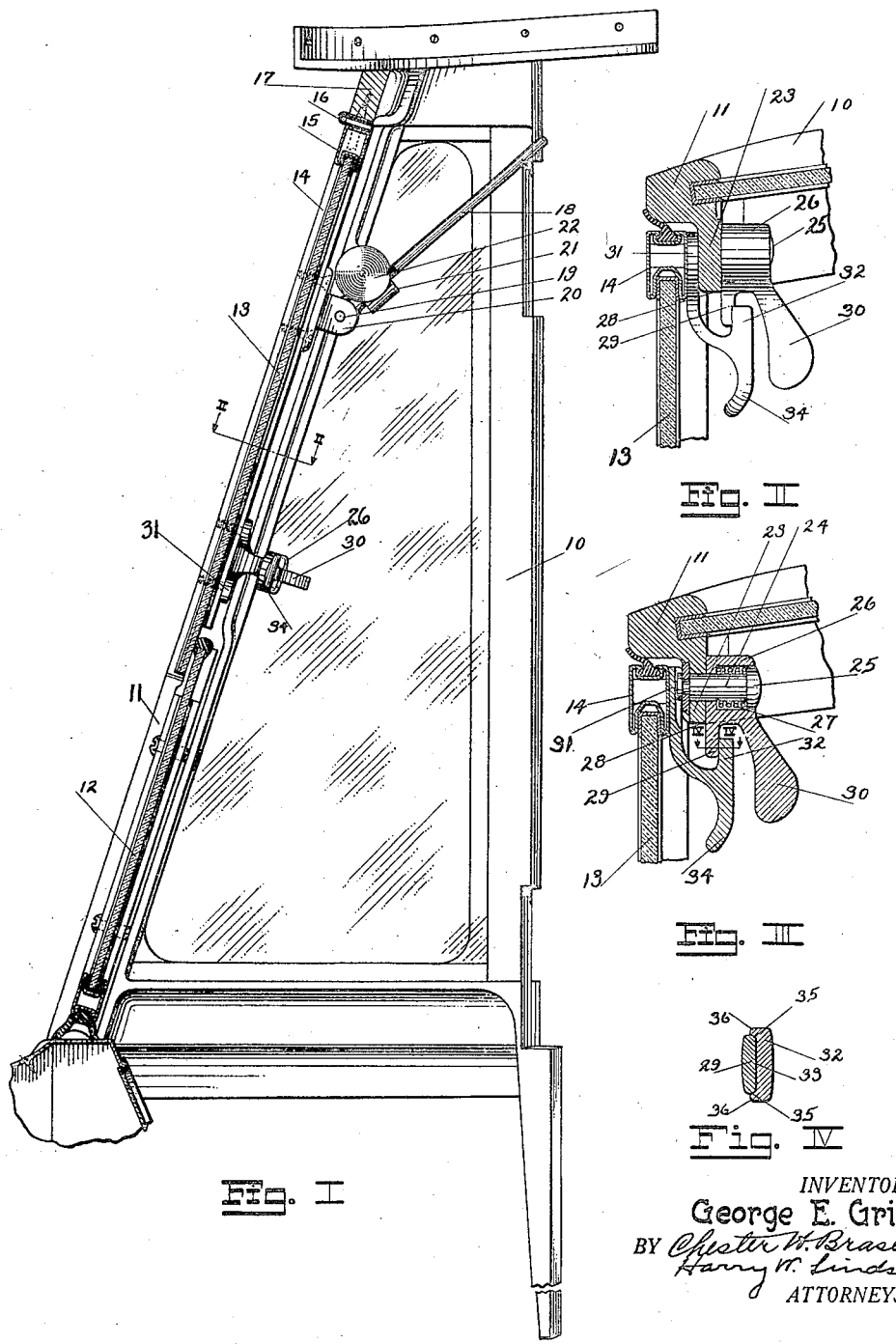
INVENTOR.  
George E. Grimm  
BY Chester W. Braselton  
Harry W. Lindsey Jr.  
ATTORNEYS Patented Nov. 13, 1923.

1,474,076

UNITED STATES PATENT OFFICE.

GEORGE E. GRIMM, OF TOLEDO, OHIO, ASSIGNOR TO THE WILLYS-OVERLAND COMPANY, OF TOLEDO, OHIO, A CORPORATION OF OHIO.

WINDSHIELD LATCH.

Application filed September 14, 1920. Serial No. 410,225.

*To all whom it may concern:*

Be it known that I, GEORGE E. GRIMM, residing at Toledo, in the county of Lucas and State of Ohio, have invented certain new and useful Improvements in Windshield Latches, of which I declare the following to be a full, clear, and exact description.

This invention relates to improvements in windshield latches, and is intended particularly for use upon swinging windshields, although susceptible of use upon other types of movable windshields. In some of its aspects, the invention is capable of more or less general application as a fastening for moving elements.

One object of the invention is the provision of a latch which shall be positive in its action and yet easily operated.

Another object is the provision of a combined latch retainer and operating handle for the moving element.

A further object is the provision of a resilient mounting for the latch which shall permit the latter to be tilted for the purpose particularly of enabling the engaging lip of the latch to pass over a shoulder on the latch retainer before seating itself in the depression provided in the retainer.

Still another object is the provision of a handle for the latch extending radially in the same direction as the engaging lip or projection and by means of which the tilting of the latch may be accomplished if desired. The invention contemplates, however, the use of a cam surface or surfaces to cause the aforesaid tilting.

Another object is the arrangement of the handle upon the retainer and that upon the latch so as to overlie each other when the latch is fastened, thereby enabling an operator to manipulate the windshield and to engage or disengage the fastener by the use of one hand only.

Other objects and objects relating to details of construction and economies of manufacture, will appear as I proceed with the description of that embodiment of the invention which, for the purposes of the present application, I have illustrated in the accompanying drawing, in which:

Figure I is a vertical sectional view through a windshield to which my invention is applied.

Figure II is a fragmental, sectional view through a side post and the adjacent portion of a windshield with my retainer and latch in plan, the section being taken upon the line II—II of Figure I.

Figure III is a view similar to Figure II, but showing the retainer and latch in section.

Figure IV is a section on the line IV—IV of Figure III, showing the means for holding the latch in the retainer against accidental displacement.

Similar reference characters refer to like parts throughout the views.

In the drawing, 10 represents one of two triangular side frames designed to be mounted upon the body of an automobile of the closed type for supporting the front end of the automobile top. The forward posts 11 of these frames are utilized as the side posts of the windshield. 12 is a fixed windshield section with which the present invention is not concerned. 13 is an upper movable windshield having side frame members 14 and a top frame member 15, the latter being hinged at 16 to a transverse rail 17, whereby the lower end of the windshield may be swung out for ventilating purposes.

Any suitable means may be employed for holding the windshield in different open adjustments, that disclosed in the drawing consisting of a rod 18 pivoted at 19 to a bracket 20 carried by the windshield frame, the rod being slidable through a sleeve 21 pivoted to the post 11 and being locked in different positions by means of a set screw 22.

As shown in Figures II and III, the post 11 is rabbeted on its inner front side for the reception of the side frame member 14 leaving a narrow portion 23. In the latter a pin 24 is fixed by any suitable means and extends backwardly for a distance, terminating in a head 25. The latch 26, which is provided with a cup-shaped recess of a diameter slightly greater than that of the head 25, is loosely mounted upon the pin 24 so as to permit not only pivotal motion upon the pin but also a considerable rocking motion with respect thereto. The latch has a flat base bearing upon the flat rear surface of the post 11. Within the cup-shaped recess is a coil spring 27 bearing upon its opposite ends against the base of the recess and the head 25, thereby tending to hold the base of the latch snugly against the post 11. The flat base of the latch is extended upon one side so as to project a considerable distance beyond the corner 28 when the latch is in operative position or in a position approaching operative position. In the present instance this extension forms the projection 29 which engaged the latch retainer. A handle 30 extends radially from the latch 26 in a direction generally parallel to that of the projection 29.

I prefer to use in connection with my latch a combined retainer and operating handle upon the windshield. This element as shown in the drawing is roughly Y-shaped and has one arm 31 secured firmly to the side frame member 14 of the windshield. The other arm 32 constitutes the retainer proper and is provided with a depression 33 (see Figure IV), upon its forward face for the reception of the latch projection 29. The tail 34 of the Y constitutes the handle by means of which the operator manipulates the windshield. This handle is particularly useful in drawing the windshield to a tightly closed position. The side edges of the latch projection 29 are rounded as shown at 35 and the side edges of the retainer 32 are rounded as shown at 36 whereby co-acting cam surfaces are provided, by virtue of which the latch is rocked upon the corner 28 as a pivot when the handle 30 is turned, which enables the projection 29 to clear the shoulder upon the edge of the retainer 32.

In the drawing and in the foregoing description, the latch is mounted upon the fixed member and the retainer upon the movable member, and this is the arrangement which I have found to be best where the invention is employed as a windshield fastener, but it is obvious that the arrangement of the parts might be reversed without departing from the spirit of the invention, while in other applications of the latch, a reversed arrangement might be preferable.

The operation of my invention will require little explanation in view of the foregoing description of the parts. Assuming that the windshield is in open position and that it is desired to close and latch the same, the set screw 22 is loosened, when the windshield will swing down by force of gravity to a nearly closed position. The operator then places the first finger of each hand in front of the handle 34 on either side of the windshield if two latches are used, and draws the windshield to a tightly closed position, after which by the use of his thumbs, he swings the handles 30 into position in front of the handles 34, thus causing the projections 29 to pass over the front surfaces of the retainers 32 and into the depressions 33, therein. The windshield is then in locked position and the accidental disengagement of the latches is impossible because the projections are resiliently held in the depressions 33.

The cam surfaces upon the edges of the parts 29 and 32 above referred to, while desirable and while constituting an important feature of my invention in its most efficient form, are not absolutely essential as the operator can cause the latch projection 29 to clear the shoulder on the retainer 32 by pushing forwardly upon the handle 30 to rock the latch upon the corner 28 of the post 11 against the action of the springs 27.

I am aware that my invention, above described and illustrated in the accompanying drawing, is susceptible of various modifications without departing from the spirit thereof and therefore I desire to claim my invention broadly as well as specifically as indicated in the appended claims.

Having thus described my invention, what I claim as new and desire to secure by Letters Patent, is:

1. In combination, windshield side posts, a windshield frame hinged to swing vertically and having side members adapted to rest against said posts, a retainer secured to one of said side members and having a projection adapted to extend to one side and to the rear of the adjacent post when the frame is closed, and latching means mounted upon the rear of said post to engage said retainer.

2. In combination, windshield side posts, a windshield frame hinged to swing vertically and having side members adapted to rest against said posts, a retainer secured to one of said side members and having a handle and a projection adapted to extend to one side and to the rear of the adjacent post when the frame is closed, and a latch pivotally mounted upon said post, said latch having a lip adapted to engage said retainer.

3. In combination, windshield side posts, a windshield frame hinged to swing vertically and having side members adapted to rest against said posts, a retainer secured to one of said side members and having a handle and a projection adapted to extend to one side and to the rear of the adjacent post when the frame is closed, and a latch pivotally mounted upon said post, said latch having a lip adapted to engage said retainer and an operating handle positioned to be moved toward said first handle to fasten the latch.

4. In combination, windshield side posts, a windshield frame hinged to swing vertically and having side members adapted to rest against said posts, a retainer secured to one of said side members and having a projection adapted to extend to one side and to the rear of the adjacent post when the frame is closed, and a latch pivotally mounted upon said post, said latch having a lip adapted to engage said retainer, one of said engaging elements having a cam surface, and said pivotal mounting including a resilient element.

5. In combination, windshield side posts, a windshield frame hinged to swing vertically and having side members adapted to rest against said posts, a retainer secured to one of said side members and having a projection adapted to extend to one side and to the rear of the adjacent post, the forward side of said projection being provided with a depression, a latch pivotally mounted upon said post, said latch having a lip adapted to engage in said depression, one of said engaging elements having a cam surface over which the other rides, and said pivotal mounting including a resilient element.

6. In combination, a windshield side post, a headed pin mounted in said post and extending rearwardly therefrom, a latch comprising a hub mounted loosely on said pin, a coil spring surrounding said pin and bearing at its ends upon said hub and the head of said pin, said latch including a radial lip of a length sufficient to extend beyond said post, and a windshield carrying a retainer adapted to be engaged by said lip.

7. In combination, a windshield side post, a headed pin mounted in said post and extending rearwardly therefrom, a latch comprising a hub mounted loosely on said pin, a coil spring surrounding said pin and bearing at its ends upon said hub and the head of said pin, said latch including a radial lip of a length sufficient to extend beyond said post, and a windshield carrying a retainer adapted to be engaged by said lip, one of said engaging elements having a depression into which the other element is adapted to fit.

8. In combination, a movable windshield, a support or abutment therefor, a retainer secured to the inner face of said windshield having a projection adapted to extend to one side and to the rear of said support, a windshield operating handle integral with said retainer, and a latch mounted upon the support to engage said projection.

9. In combination, a movable windshield, a support or abutment therefor, a retainer secured to said windshield and having a projection extending to one side and to the rear of said support, a windshield operating handle integral with said retainer, and extending in a direction opposite that of said projection, a latch mounted upon the said support to engage the said projection, and a handle for said latch adapted to overlie said first named handle.

10. In combination, a movable windshield, a support or abutment therefor, a retainer secured to said windshield and having a projection extending to one side and to the rear of said support, a windshield operating handle integral with said retainer and extending in a direction opposite that of the said projection, a latch pivotally mounted upon the said support to engage the said projection, and a handle for said latch arranged to overlie said first named handle when the latch is fastened.

11. In combination, a post, a pin projecting from one side thereof, a latch loosely mounted upon said pin and having a flat base bearing against the face of the post, one side of said latch having a projection, the base of the latch on the same side being adapted to extend beyond the adjacent corner of the post, resilient means tending to hold the said latch against said post, an operating handle for said latch, and a movable element having a latch retainer secured thereto and adapted to be engaged by said projection.

12. In combination, a pair of relatively movable elements to be latched, one of said elements having a flat side from which extends a pin, a latch loosely mounted upon said pin and having a flat base bearing against said flat side, one side of said latch having a projection, the base of the latch on the same side being adapted to extend beyond the adjacent corner of the element upon which it is mounted, resilient means tending to hold the face of said latch against said flat side, an operating handle for said latch, the other of said elements having a latch retainer secured thereto and adapted to be engaged by said projection.

13. In combination, a pair of relatively movable elements to be latched, one of said elements having a flat side from which extends a pin, a latch loosely mounted upon said pin and having a flat base bearing against said flat side, one side of said latch having a projection, the base of the latch on the same side being adapted to extend beyond the adjacent corner of the element upon which it is mounted, resilient means tending to hold the face of said latch against said flat side, an operating handle for said latch, the other of said elements having a latch retainer secured thereto and adapted to be engaged by said projection, one of said engaging parts having a cam surface over which the other part is adapted to ride.

14. In combination, a pair of relatively movable elements to be latched, one of said elements having a flat side from which extends a pin, a latch loosely mounted upon said pin and having a flat base bearing against said flat side, one side of said latch having a projection, the base of the latch on the same side being adapted to extend beyond the adjacent corner of the element upon which it is mounted, resilient means tending to hold the face of said latch against said flat side, an operating handle for said latch, the other of said elements having a latch retainer secured thereto and adapted to be engaged by said projection, one of said engaging parts having a cam surface over which the other part is adapted to ride, said engaging parts being also provided with a co-operating projection and depression adapted to detachably interengage.

15. In combination, a windshield having a side frame member and mounted to swing vertically, a side post having a portion overhanging said side frame member when said windshield is in closed position, a combined latch retainer and operating handle carried by said side frame members and extending around one side of and to the rear of the overhanging portion of said post and a latch carried by said post for engaging said retainer to clamp the windshield to the post, said latch having a handle positioned to aline with said operating handle when the windshield is clamped in closed position.

In testimony whereof, I affix my signature.

GEORGE E. GRIMM.